United States Patent
Bernwanger, Jr. et al.

(10) Patent No.: US 10,113,338 B2
(45) Date of Patent: *Oct. 30, 2018

(54) MOTOR VEHICLE DOOR LOCK STATUS SYSTEM AND RELATED METHOD

(71) Applicant: FORD GLOBAL TECHNOLOGIES, LLC, Dearborn, MI (US)

(72) Inventors: George Anthony Bernwanger, Jr., Northville, MI (US); Howard Paul Tsvi Linden, Southfield, MI (US); Pawan Gupta, Troy, MI (US); John Thomas Ricks, Taylor, MI (US); Rajesh K. Patel, Farmington Hill, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/678,622

(22) Filed: Aug. 16, 2017

(65) Prior Publication Data
US 2017/0350167 A1 Dec. 7, 2017

Related U.S. Application Data

(63) Continuation of application No. 15/052,411, filed on Feb. 24, 2016, now Pat. No. 9,850,690.

(51) Int. Cl.
*E05B 81/00* (2014.01)
*B60R 25/10* (2013.01)
(Continued)

(52) U.S. Cl.
CPC .............. *E05B 81/00* (2013.01); *B60R 16/02* (2013.01); *B60R 25/10* (2013.01); *E05B 77/22* (2013.01); *E05B 81/74* (2013.01)

(58) Field of Classification Search
CPC .......... E05B 77/00; E05B 77/14; E05B 77/22; E05B 77/32; E05B 81/00; E05B 81/02;
(Continued)

(56) References Cited

U.S. PATENT DOCUMENTS 3,697,943 A 10/1972 Rudolf
4,926,332 A 5/1990 Komuro et al.
(Continued)

FOREIGN PATENT DOCUMENTS

| CN | 203063785 U | 7/2013 |
| DE | 4104119 A1 | 8/1992 |
| GB | 263900 A | 1/1927 |

OTHER PUBLICATIONS

"Condition Indicators Action is Needed by Driver"; 2013 Honda Accord Sedan Technology Reference Guide; https://www.honda.ca/Content/honda.ca/en/2015/accord_hybrid/hybrid_10300/GenericLink/TechnologyReferenceGuide_EN.pdf; 2012 Honda Canada Inc.; pp. 1-43.

*Primary Examiner* — Van Trieu
(74) *Attorney, Agent, or Firm* — Jason Rogers; King & Schickli, PLLC

(57) ABSTRACT

A motor vehicle door lock status system is provided. That system includes a door lock actuator, a door lock status indicator for indicating lock status of the multiple motor vehicle doors, and a controller. The controller is connected to the door lock actuator and the door lock status indicator. Further, the controller is configured to provide a door open signal, an all doors closed and locked signal and a failure to lock signal. A related method of indicating door lock status of a motor vehicle is also disclosed.

10 Claims, 4 Drawing Sheets

(51) Int. Cl.
*B60R 16/02* (2006.01)
*E05B 77/22* (2014.01)
*E05B 81/74* (2014.01)

(58) Field of Classification Search
CPC .......... E05B 81/04; E05B 81/12; E05B 81/13;
E05B 81/54; E05B 81/58; E05B 81/60;
E05B 81/74; E05B 81/72; E05F 15/40;
E05F 15/73; G07C 2009/00507; G07C
2009/00515; G07C 2009/00539; B60R
21/00; B60R 25/00
See application file for complete search history.

(56) References Cited

U.S. PATENT DOCUMENTS

| | | |
|---|---|---|
| 5,614,769 A | 3/1997 | Kuroda |
| 6,133,827 A | 10/2000 | Alvey et al. |
| 7,106,005 B2 * | 9/2006 | Tsuchiya ................. B60Q 3/80 315/77 |
| 7,559,678 B2 | 7/2009 | Tsai |
| 8,686,842 B2 | 4/2014 | Schuessler et al. |
| 9,850,690 B2 * | 12/2017 | Bernwanger, Jr. ...... E05B 81/00 |
| 2004/0142732 A1 | 7/2004 | Ueda et al. |
| 2006/0226953 A1 | 10/2006 | Shelley et al. |
| 2008/0143499 A1 | 6/2008 | Shimomura |
| 2011/0285522 A1 | 11/2011 | Schuessler et al. |
| 2015/0254963 A1 | 9/2015 | Kakinuma |
| 2017/0218678 A1 * | 8/2017 | Kothari ................. E05F 15/73 |

* cited by examiner

MOTOR VEHICLE DOOR LOCK STATUS SYSTEM AND RELATED METHOD

This is a continuation of U.S. patent application Ser. No. 15/052,411 (now U.S. Pat. No. 9,850,690) filed on Feb. 24, 2016.

TECHNICAL FIELD

This document relates generally to the motor vehicle equipment field and, more particularly, to a motor vehicle door lock status system and related method of indicating system wide door lock status of a motor vehicle.

BACKGROUND

Today's motor vehicles are equipped with a toggle, soldier post or light source such as a light emitting diode (LED) in the driver's door to advise the driver of the status of the driver's door lock. Many vehicles also include a similar toggle, soldier post or light source/LED in each of the other doors in order to advise of the lock status of each individual door.

Significantly, the status of the driver's door is not always indicative of the system wide status of the doors of the motor vehicle. Thus, a driver may misinterpret an indicated driver's door lock status to reflect the lock status of all of the doors of the motor vehicle. This can be incorrect and unsafe. Further, it should also be appreciated that there is no warning or indication provided by the driver's door toggle, soldier post or light source/LED in the event any of the motor vehicle doors do not actually lock (because they are ajar, because of system malfunction or for any other reason) when one manipulates the door lock actuator to lock the doors.

This document relates to a new and improved motor vehicle door lock status system and related method that clearly indicates the door lock status of all of the multiple doors of the motor vehicle.

SUMMARY

In accordance with the purposes and benefits described herein, a motor vehicle door lock status system is provided. That motor vehicle door lock status system comprises a door lock actuator, a door lock status indicator, indicating the lock status of the multiple motor vehicle doors, and a controller. The controller is connected to the door lock status actuator and the door lock status indicator. Further, the controller is configured to provide by means of the door lock status indicator: (a) a door open signal, (b) an all doors are closed and locked signal and (c) a failure to lock signal depending upon the actual real time status of each door included in the motor vehicle door lock status system following any change in door lock status.

The door lock status indicator may be a light source such as a bi-color light emitting diode. In another possible embodiment, the door lock status indicator may be a first light emitting diode of a first color, and a second light emitting diode of a second color. In yet another possible embodiment, the door lock status indicator may comprise multiple icons that may be illuminated to give a clear indication of the lock status of all of the doors of the motor vehicle.

The door lock status indicator may be carried on a driver's door of the motor vehicle. In one such embodiment, the door lock status indicator may be carried on the driver's door adjacent the belt line of the motor vehicle, such as along the top of the interior portion of the vehicle door where it is visible through the window from the exterior of the vehicle.

The motor vehicle door lock status system may also include a first door lock regulator for a first motor vehicle door and a second door lock regulator for a second motor vehicle door. In such an embodiment the controller may be configured to include a first data input connected to the first door lock regulator and a second data input connected to the second door lock regulator.

In some embodiments, the motor vehicle door lock status system may include a third door lock regulator connected to a third motor vehicle door and a fourth door lock regulator connected to a fourth motor vehicle door. In such embodiments, the controller may be configured to include a third data input connected to the third door lock regulator and a fourth data input connected to the fourth door lock regulator. In this way, all doors of the motor vehicle door lock status system may be locked or unlocked and their lock status may be accurately monitored in real time and displayed by the door lock status indicator.

In accordance with an additional aspect, a method of indicating door lock status of the motor vehicle is provided. That method may be described as comprising the steps of monitoring, by controller, the door lock status of multiple doors of a motor vehicle and indicating, by indicator, the door lock status of the multiple doors of the motor vehicle. That indicating may be selected from a group of indications consisting of a door open signal, an all doors closed and locked signal and a failure of all doors to lock signal.

The method may further include the step of providing the door open signal by illuminating a light source of a first color. Further, the method may include providing the all doors closed and locked signal by illuminating a light source of a second color. Still further, the method may include the step of providing the failure of all doors to lock signal by flashing a light source and then extinguishing that light source.

Still further, the method may include the step of indicating the door status of the multiple doors of the motor vehicle by means of at least one light source provided on a driver's door of the motor vehicle.

Still further, the method of indicating door lock status of a motor vehicle may comprise the steps of monitoring, by controller, the door lock status of multiple doors of the motor vehicle and indicating, by indicator carried on a driver's door of the motor vehicle, the door lock status of the multiple doors of the motor vehicle.

The method may further include the step of mounting the indicator at a position on the driver's door adjacent a belt line of the motor vehicle. Further, the method may include the step of mounting the indicator on the driver's door adjacent a door lock actuator for selectively locking and unlocking the doors of the motor vehicle.

Still further, the indicator may be a light source. In such an embodiment, the method may further include illuminating the light source to indicate door lock status of the multiple doors of the motor vehicle. Further, the method may include the step of extinguishing that light source after a predetermined period of time following any change in door lock status.

In the following description, there are shown and described several preferred embodiments of the motor vehicle door lock status system and related method. As it should be realized, the system and method are capable of other, different embodiments and their several details are capable of modification in various, obvious aspects all without departing from the system and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the motor vehicle door lock status system and method of indicating door lock status of a motor vehicle. These illustrations, together with the description, serve to explain certain principles of the system and method. In the drawing figures.

Reference will now be made in detail to the present preferred embodiments of the motor vehicle door lock status system and method, examples of which are illustrated in the accompanying drawing figures.

DETAILED DESCRIPTION

Figure 1:
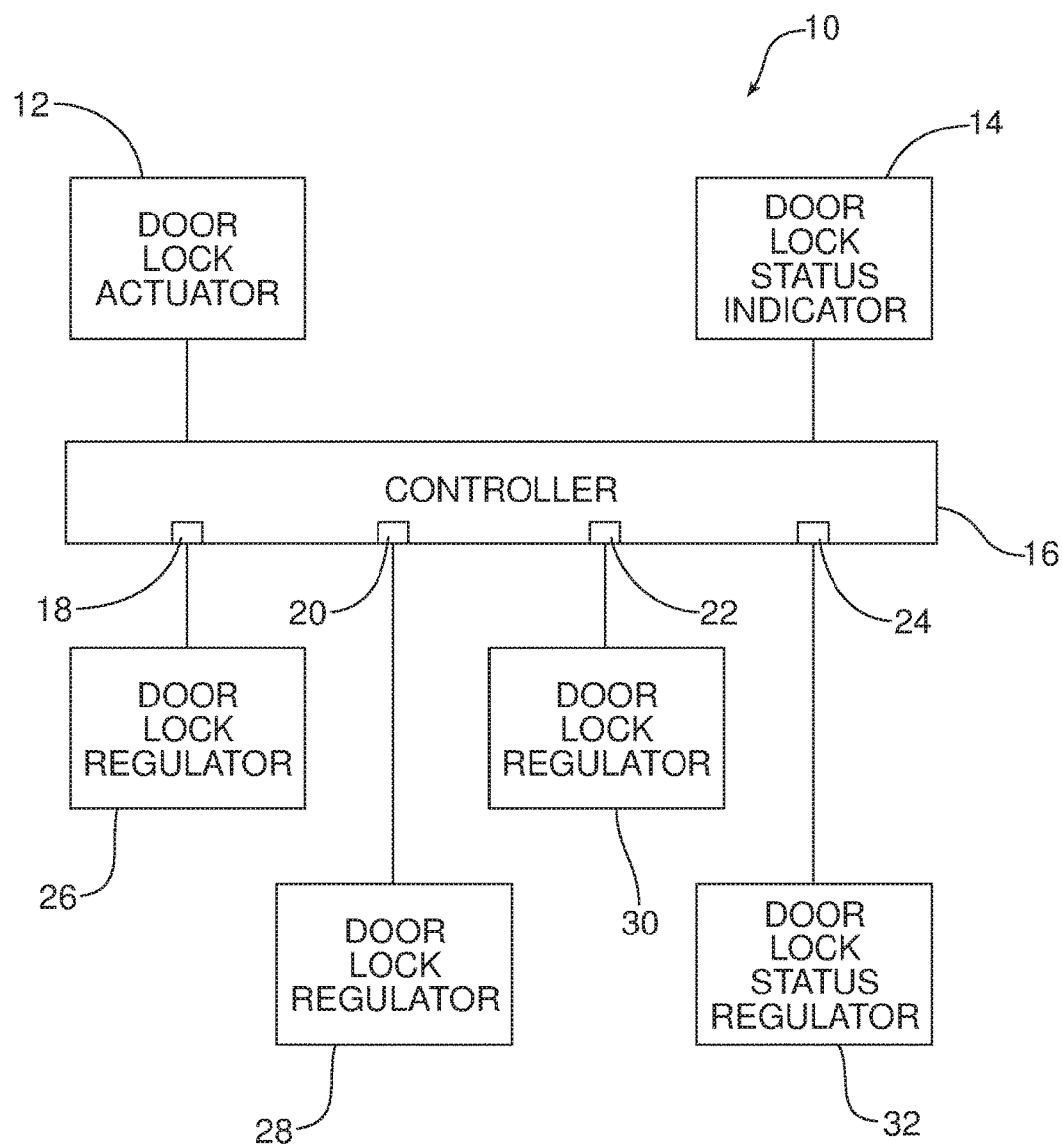
FIG. 1 is a schematic block diagram of the motor vehicle door lock status system.

Reference is now made to FIG. 1 illustrating the motor vehicle door lock status system 10. As illustrated, the motor vehicle door lock status system 10 includes a door lock actuator 12 for selectively locking and unlocking all of the multiple motor vehicle doors of the motor vehicle included within the system 10. Further, the system 10 includes a door lock status indicator 14 for indicating the lock status of the multiple motor vehicle doors. In addition, the system 10 includes a controller 16.

The controller 16 is connected to the door lock actuator 12 and the door lock status indicator 14. Further, the controller 16 is configured to provide multiple signals through the door lock status indicator 14 including (a) a door open signal, (b) an all doors closed and locked signal and (c) a failure to lock signal.

The controller 16 comprises a computing device such as, for example, a dedicated microprocessor or an electronic control unit (ECU) operating in accordance with instructions from appropriate control software. Such a controller 16 includes one or more processors, one or more memories and one or more network interfaces communicating with each other over a communication bus.

In the illustrated embodiment, the controller 16 includes four data inputs 18, 20, 22, 24 connected to respective door lock regulators 26, 28, 30 and 32 connected to the driver's door, the front passenger door, the driver's side rear door and the passenger side rear door (not illustrated for simplicity of illustration). And as is known in the art, each door lock regulator 26, 28, 30, 32 includes an electronic lock and cooperating controller for locking and unlocking the motor vehicle door with which the door lock regulator 26, 28, 30, 32 is associated.

Figure 2:
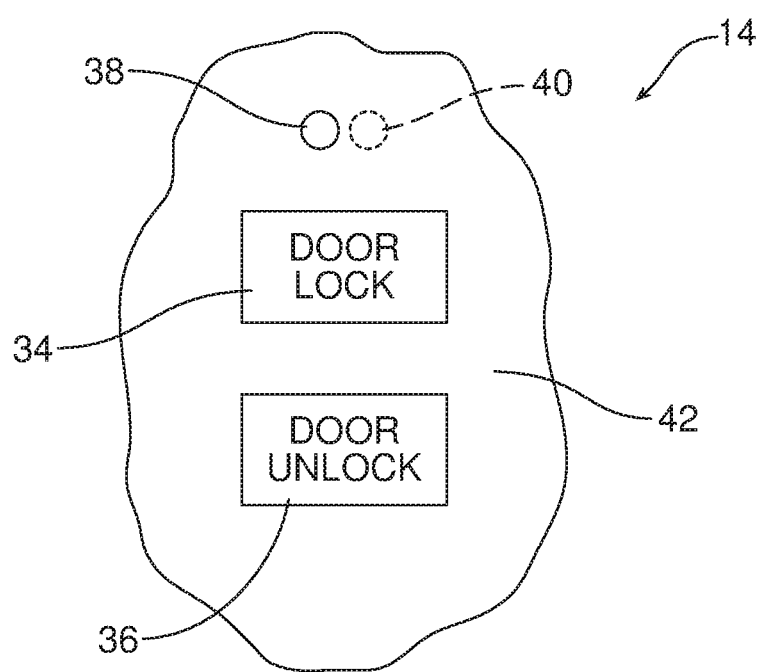
FIG. 2 is a detailed perspective view of one possible embodiment of the motor vehicle door lock status system including an actuator for operating the motor vehicle door lock system and a door lock status indicator both mounted on the driver's door of the motor vehicle.

Reference is now made to FIG. 2 illustrating an embodiment wherein the door lock actuator 12 comprises a door lock button 34 and a separate door unlock button 36. It should be appreciated, however, that in alternative embodiments, the door lock actuator 12 may comprise a simple toggle switch for locking and unlocking all of the doors of the motor vehicle door lock status system 10, a single push button that alternately provides locking and unlocking function or any other actuator/switch suitable for the intended purpose of locking and unlocking the motor vehicle doors.

As further illustrated in FIG. 2, the door lock status indicator 14 may comprise a single light source such a bi-color LED 38. In an alternative embodiment, the door lock status indicator 14 comprises a first LED 38 of a first color such as green, and a second LED 40 of a second color such as red. In the embodiment illustrated in FIG. 2, the door lock status indicator 14 is mounted on a trim panel 42 of the driver's door adjacent the door lock actuator 12.

Figure 3:
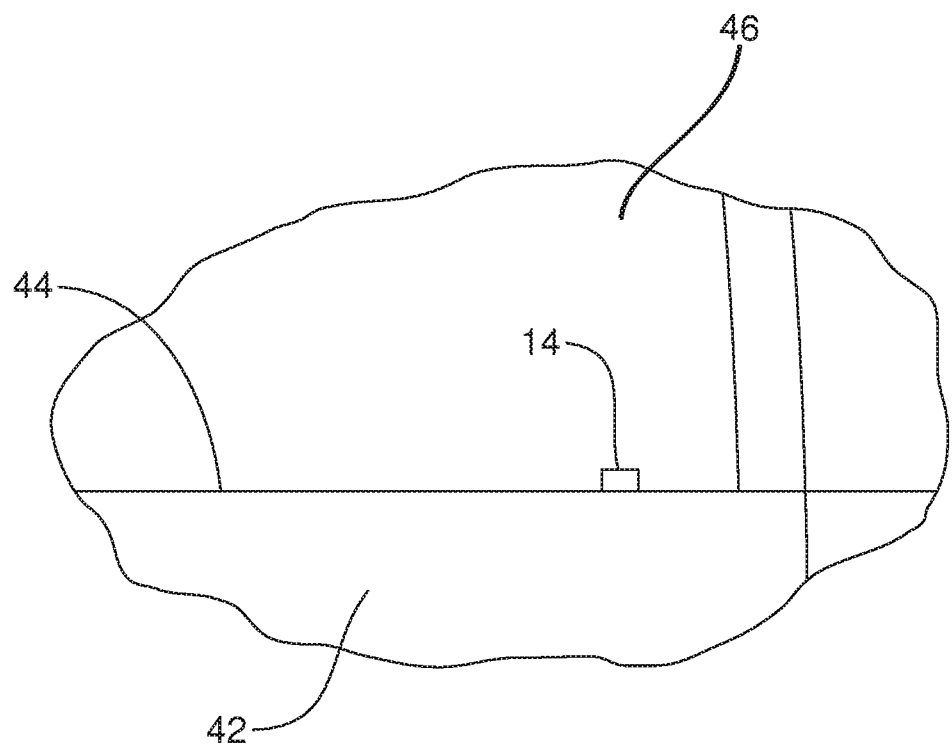
FIG. 3 is a side elevational view of an alternative embodiment of the motor vehicle door lock status system wherein the door lock status indicator is mounted along the top interior portion of the door at the belt line of the vehicle where it is visible from the exterior of the vehicle through the door window.

In the embodiment of the motor vehicle door lock status system 10 illustrated in FIG. 3, the door lock status indicator 14 is provided along an upper portion of the driver's door 42 adjacent the belt line 44 where it is visible from the exterior of the vehicle through the driver's door window 46.

As will be apparent from the following description, the motor vehicle door lock status system 10 functions to perform a method of indicating the system-wide door lock status of a motor vehicle. More specifically, the controller 16 monitors door lock status of each door included in the system 10 and indicates, by indicator 14, the door lock status of all of the doors included in the motor vehicle door lock status system 10. Possible indications are selected from a group of signals consisting of a door open signal, an all doors closed and locked signal and a failure of all doors to lock signal. In the illustrated embodiment of FIG. 2, the door open signal is provided by illuminating a light source/LED 38 giving an indication of a first color such as green.

The method may further include the step of providing the all doors closed and locked signal by illuminating a light source/LED 40 of a second color, such as red. Still further, the method may include the step of providing the failure of all doors to lock signal by flashing one or both light sources/LEDs 38, 40 and then extinguishing those light sources after a predetermined period of time of, for example, 5 to 10 seconds.

In any of the embodiments, the method may include illuminating the light source/LED 38 and/or 40 to indicate door lock status of the multiple doors of the motor vehicle. This may be followed by the step of extinguishing the light source/LED 38 and/or 40 after a predetermined period of time following any change in status of any of the door locks of the doors of the door lock system 10 as indicated by data from the associated door lock regulators 26, 28, 30, 32. Those data are provided to the controller 16 at the data inputs 18, 20, 22 and 24. The concept is to provide a visual indication of the status of all of the doors of the door lock status system 10 at a single indicator 14 on the driver's door 42 for a sufficient period of time to be noticed by the vehicle operator and then extinguishing the illuminated indicator to save the battery power of the motor vehicle.

Advantageously, by providing a clear, visual indication of the lock status of all of the doors of the motor vehicle at the driver's door, the driver is better able to ascertain when all the doors are properly locked and the vehicle is secure. In the event any one of the doors of the motor vehicle fails to lock when the door lock actuator 12, 34 is depressed to lock all of the doors, the flashing light source/LED 38 and/or 40 will give an indication of the failure of the doors to lock properly thereby signaling the operator to check the doors, find the one that is open or unlocked, properly close the door and then once again depress the door lock button 12, 34 to lock all of the doors of the motor vehicle. Proper locking of all of the doors in the motor vehicle is then subsequently indicated by the indicator 14 or 38.

Figure 4:
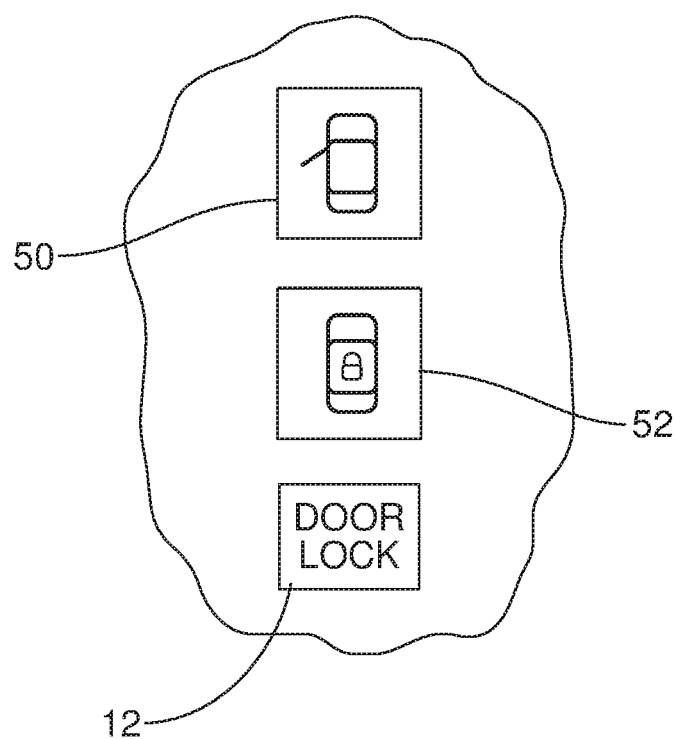
FIG. 4 is a detailed plan view of yet another embodiment wherein the door lock status indicator comprises two different icons.

The foregoing has been presented for purposes of illustration and description. It is not intended to be exhaustive or to limit the embodiments to the precise form disclosed. Obvious modifications and variations are possible in light of the above teachings. For example, as illustrated in FIG. 4, the door lock status indicator 14 may comprise multiple icons 50, 52. Icon 50 may be illuminated when one or more doors of the motor vehicle are open. Icon 52 may be illuminated when all of the doors of the motor vehicle are closed and locked. Finally, icon 50 may flash for a predetermined period of time when one or more doors of the motor vehicle fail to lock when the door lock actuator 12 is depressed. In still other embodiments, a third indicator or icon of a third color, such as yellow, may be illuminated to indicate when one or more doors fail to properly lock. All such modifications and variations are within the scope of the appended claims when interpreted in accordance with the breadth to which they are fairly, legally and equitably entitled.

What is claimed:

1. A method of monitoring door lock status of a motor vehicle, comprising:

monitoring, by controller, the door lock status of multiple doors of said motor vehicle; and indicating, by indicator carried on a driver's door of said motor vehicle, the door lock status of said multiple doors of said motor vehicle.

2. The method of claim 1, including mounting said indicator at a position on said driver's door adjacent a belt line of said motor vehicle.

3. The method of claim 1, including mounting said indicator on said driver's door adjacent a door lock actuator.

4. The method of claim 1, wherein said indicator is a light source and said method includes illuminating said light source to indicate the door lock status of said multiple doors of said motor vehicle.

5. The method of claim 4, including extinguishing said light source after a predetermined period of time following any change in door lock status.

6. The method of claim 1, including providing a door open signal by illuminating said light source in a first color.

7. The method of claim 6, including providing an all doors locked signal by illuminating said light source in a second color.

8. The method of claim 1, including providing a failure of all doors to lock signal.

9. The method of claim 1, including providing a failure of all doors to lock signal by flashing a light source and then extinguishing said light source.

10. The method of claim 1, including indicating the door lock status of said multiple doors of said motor vehicle by illuminating at least one light source provided on a driver's door of said motor vehicle.

* * * * *